(12) United States Patent
Utaka et al.

(10) Patent No.: US 7,893,590 B2
(45) Date of Patent: Feb. 22, 2011

(54) STATOR HAVING HIGH ASSEMBLY

(75) Inventors: Ryosuke Utaka, Takahama (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 76 days.

(21) Appl. No.: 12/496,005

(22) Filed: Jul. 1, 2009

(65) Prior Publication Data
US 2010/0001611 A1    Jan. 7, 2010

(30) Foreign Application Priority Data
Jul. 1, 2008    (JP)    .............................. 2008-172603

(51) Int. Cl.
H02K 1/16    (2006.01)
H02K 1/18    (2006.01)

(52) U.S. Cl. ........................ 310/216.008; 310/216.075

(58) Field of Classification Search .......... 310/216.004, 310/216.008–216.012, 216.074–216.075
See application file for complete search history.

(56) References Cited

U.S. PATENT DOCUMENTS

| 4,166,263 | A | * | 8/1979 | Harada et al. ................ 335/284 |
| 5,583,387 | A | * | 12/1996 | Takeuchi et al. ....... 310/216.009 |
| 5,786,651 | A | * | 7/1998 | Suzuki ................ 310/216.009 |
| 6,504,284 | B1 | * | 1/2003 | Kazama et al. ....... 310/216.016 |
| 6,700,284 | B2 | * | 3/2004 | Williams et al. ...... 310/216.075 |
| 7,012,350 | B2 | * | 3/2006 | Peachee et al. ............. 310/166 |
| 7,122,933 | B2 | * | 10/2006 | Horst et al. ........... 310/216.095 |
| 7,345,397 | B2 | * | 3/2008 | Sheeran et al. ........ 310/216.009 |
| 7,348,706 | B2 | * | 3/2008 | Ionel et al. ............. 310/216.009 |
| 7,667,367 | B2 | * | 2/2010 | Matsuo et al. ......... 310/216.004 |
| 7,812,498 | B2 | * | 10/2010 | Kouda ........................ 310/201 |
| 2003/0066183 | A1 | * | 4/2003 | Nouzumi ..................... 29/596 |

FOREIGN PATENT DOCUMENTS
JP    3604326    10/2004

* cited by examiner

Primary Examiner—Tran N Nguyen
(74) Attorney, Agent, or Firm—Nixon & Vanderhye PC

(57) ABSTRACT

In a stator, when a number of a plurality of core segments circumferentially arranged is represented as n, a length of a maximum projecting portion of a circumferential projection of each of the plurality of core segments from one of the first and second radial sides thereof is represented as p, a radial length of a maximum projecting portion of the circumferential projection of each of the plurality of core segments from a circumferentially extended line from the bottom of the slot is represented as q, and a length of the slot with respect to the bottom thereof in a radial direction of the stator core assembly is represented as t, the number n, the length p, the length q, and the length t meet the following equation:

$$0 < \frac{np}{\pi} - q < t.$$

5 Claims, 13 Drawing Sheets

BEGINNING OF OVERLAP

COMPLETE OVERLAP

STATOR HAVING HIGH ASSEMBLY

CROSS REFERENCE TO RELATED APPLICATIONS

This application is based on Japanese Patent Application 2008-172603 fled on Jul. 1, 2008. This application claims the benefit of priority from the Japanese Patent Application, so that the descriptions of which are all incorporated herein by reference.

FIELD OF THE INVENTION

The present invention relates to stators for rotary electric machines, and more particularly, to such stators provided with a stator core assembly made up of a plurality of core segments. In addition, the present invention relates to rotary electric machines including such a stator provided with a stator core assembly.

BACKGROUND OF THE INVENTION

Rotary electric machines for converting electrical power into rotary force (torque) and/or rotary power into electrical power have been widely used for wide industrial fields.

Such rotary electric machines are made up of a rotor and a stator located relative thereto. The stator consists of a stator core and a stator coil assembled in the stator core for creating a rotating magnetic field when energized.

In these rotary electric machines, in order to improve assembly of the stator coil into the stator core, some types of rotary electric machines including a specific stator are proposed; this specific stator consists of a stator core assembly made up of a plurality of core segments. Such a specific stator is for example disclosed in Japanese Patent Publication No. 3604326.

The stator disclosed in the Japanese Patent Publication includes a ring stator core assembly consisting of a plurality of fan-shaped yoke pieces (core segments). The yoke pieces are annually arranged such that one side end of each yoke piece and one side end of another yoke piece adjacent thereto in the annular direction are overlapped with each other in an axial direction of the whole of the yoke pieces. Each of the yoke pieces is formed at its inner side with a plurality of teeth; these teeth provide slots therebetween.

The ring stator also consists of a preformed ring stator coil assembled in the stator core. The stator coil is formed with a plurality of radial windows therethrough.

When the yoke pieces and the stator coil are assembled to each other to provide the stator, the yoke pieces are arranged around the outer circumference of the stator coil.

Next, the yoke pieces are moved toward the stator coil so that the teeth are inserted in the radial windows, respectively.

Thereafter, the overlapped sides of the yoke pieces are joined to each other to thereby provide the stator core assembly and stator.

However, in such stators formed in such a manner that the yoke pieces are moved toward the stator coil so that the teeth are respectively inserted in the radial windows, the assembling of the yoke pieces into the stator coil may cause damage to the stator coil.

Specifically, before the yoke pieces are moved toward the stator coil, one side end of each yoke piece and one side end of another yoke piece adjacent thereto in the annular direction have been overlapped with each other.

For this reason, when the yoke pieces are moved toward the stator coil, it is necessary to hold the yoke pieces such that the overlapped sides of the adjacent yoke pieces are pressed in the axial direction. This holding however may cause the yoke pieces to swing in the circumferential direction when the yoke pieces are moved toward the stator coil. This may cause the teeth to hit on the stator coil so that the stator coil may become damaged.

SUMMARY OF THE INVENTION

In view of the background, an object of at least one aspect of the present invention is to provide stators for rotary electric machines, each stator includes a core assembly made up of a plurality of core segments; these stators provide high assembly of the plurality of core segments so as to prevent damage during assembling.

According to one aspect of the present invention, there is provided a stator for a rotary electric machine. The stator includes a stator core assembly provided with a plurality of core segments, and a stator coil assembled in the stator core assembly. Each of the plurality of core segments includes a yoke having an inner circumferential surface, a first radial side, and a second radial side opposite thereto. Each of the plurality of core segments includes two teeth extending, in corresponding radial directions of the stator core assembly, from the inner circumferential surface and circumferentially aligned at a space therebetween. The two teeth and a part of the inner circumferential surface between the two teeth define a slot, and the part of the inner circumferential surface is defined as a bottom of the slot. Each of the plurality of core segments includes a circumferential projection formed on at least part of one of the first and second radial sides, and a recess formed in the other of the first and second radial sides. The circumferential projection has a shape to be fitted in the recess. The plurality of core segments are circumferentially arranged such that the projection of each of the plurality of core segments is fitted in the recess of an alternative one of the plurality of core segments to thereby provide the stator core assembly. The recess of the alternative one of the plurality of core segments is circumferentially adjacent to the projection of each of the plurality of core segments. When a number of the plurality of core segments circumferentially arranged is represented as n, a length of a maximum projecting portion of the circumferential projection of each of the plurality of core segments from the one of the first and second radial sides thereof is represented as p, a radial length of the maximum projecting portion of the projection of each of the plurality of core segments from a circumferentially extended line from the bottom of the slot is represented as q, and a length of the slot with respect to the bottom thereof in a radial direction of the stator core assembly is represented as t, the number n, the length p, the length q, and the length t meet the following equation:

$$0 < \frac{np}{\pi} - q < t$$

According to another aspect of the present invention, there is provided a stator for a rotary electric machine. The stator includes a stator core assembly provided with a plurality of core segments, and a stator coil assembled in the stator core assembly. Each of the plurality of core segments includes a yoke having an inner circumferential surface, a first radial side, and a second radial side opposite thereto, and two teeth extending, in corresponding radial directions of the stator core assembly, from the inner circumferential surface and circumferentially aligned at a space therebetween. The two teeth and a part of the inner circumferential surface between the two teeth define a slot and the part of the inner circumferential surface is defined as a bottom of the slot. The plurality of core segments are circumferentially arranged such that the first radial side of each of the plurality of core segments is closely contacted onto the second radial side of an alternative one of the plurality of core segments to thereby provide the stator core assembly. A circumferential length between a circumferentially maximum portion of the first radial side and a circumferentially minimum portion of the second radial side of each of the plurality of core segments is represented as L, and a circumferential length s from a radial center line radially passing at a center of the bottom of the slot is defined as a circumferential length of (L/2) from the radial center line. When a number of the plurality of core segments circumferentially arranged is represented as n, a circumferential length from a radial line separated by the circumferential length s from the radial center line is represented as p, a radial length, from a circumferentially extended line from the bottom of the slot, of the circumferentially maximum portion of the first radial side of each of the plurality of core segments is represented as q, and a length of the slot with respect to the bottom thereof in a radial direction of the stator core assembly is represented as t, the number n, the length p, the length q, and the length t meet the following equation:

$$0 < \frac{np}{\pi} - q < t$$

According to a further aspect of the present invention, there is provided a rotary electric machine. The rotary electric machine includes a stator according to the one aspect of the present invention. The stator coil of the stator has a substantially annular shape. The rotary electric machine also includes a rotor having an outer circumferential surface and disposed such that an inner circumference of the stator coil surrounds the outer circumferential surface of the rotor. The rotor includes a plurality of first poles and a plurality of second poles. Each of the first pole is different in magnetic polarity from each of the second pole. The first poles and the second poles are alternately arranged on the outer circumference of the rotor in a circumferential direction thereof.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
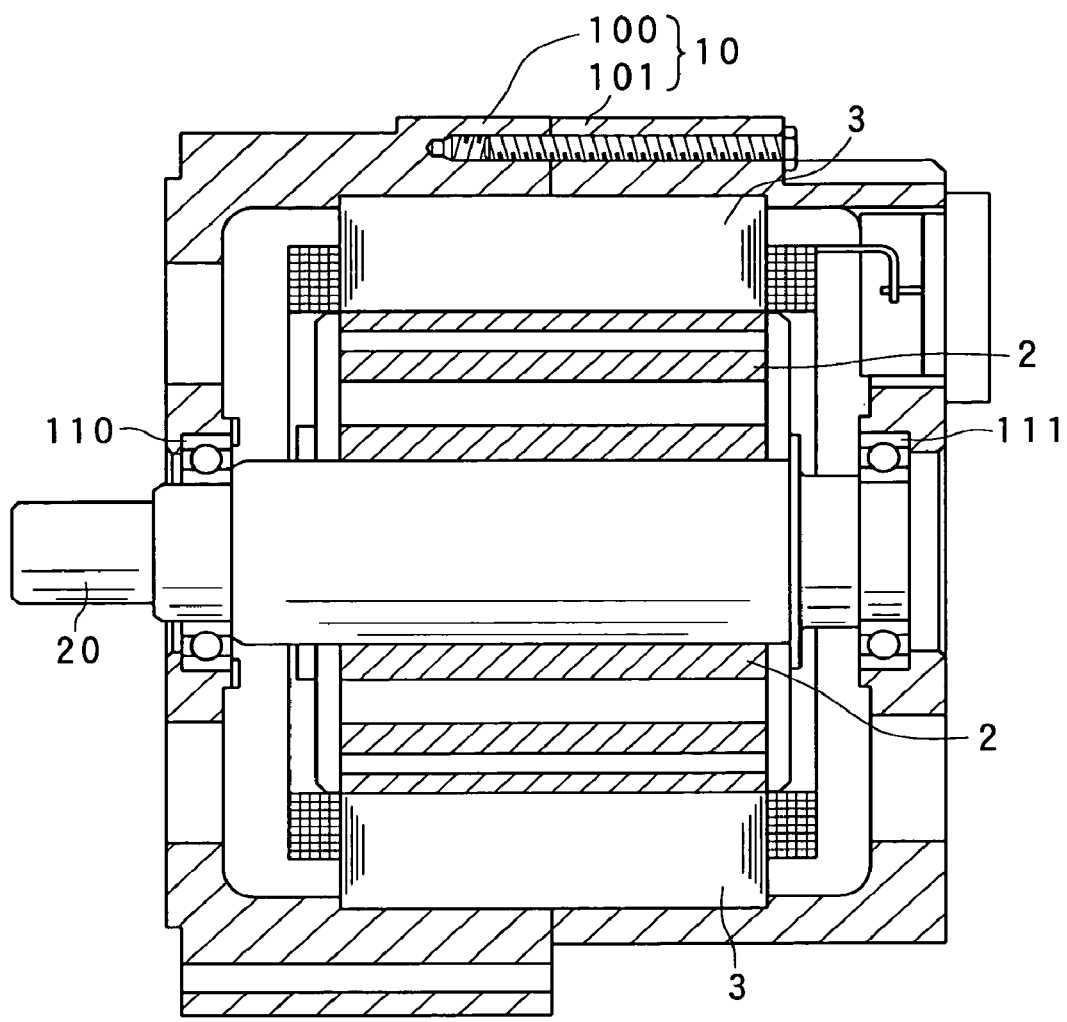
FIG. 1 is a partially longitudinal sectional view illustrating an internal structure of a rotary electric machine according to an embodiment of the present invention.

Referring to the drawings, in which like reference characters refer to like parts in several views, particularly to FIG. 1, there is illustrated a rotary electric machine 1 according to an embodiment of the present invention; this rotary electric machine works to convert electrical power into rotary force (torque) and/or rotary power into electrical power. The rotary electric machine will be referred to simply as "machine" hereinafter.

The machine 1 includes a hollow housing assembly 10, a rotor 2, and a stator 3. The housing assembly 10 is made up of a front housing 100 and a rear housing 101; these housings 100 and 101 are joined at their openings together. The machine 1 includes a pair of bearings 110 and 111 installed in the housing assembly 10; these bearings 110 and 111 rotatably support a rotary shaft 20.

The rotor 2 has a substantially annular shape and is coaxially fit on the rotary shaft 20. The stator 3 has a substantially annular shape and is disposed inside the housing assembly 10 coaxially around the outer circumference of the rotor 2.

The rotor 2 is provided at its outer circumference with a plurality of permanent magnets aligned in the circumferential direction and facing the inner circumference of the stator 3. The permanent magnets have N-poles and S-poles alternately arranged in the circumferential direction of the rotor 2. The number of the poles depends on the type of the machine 1. For example, in the embodiment, the rotor 2 has four S-poles and four N-poles. The total number of the poles is eight (8).

Figure 2:
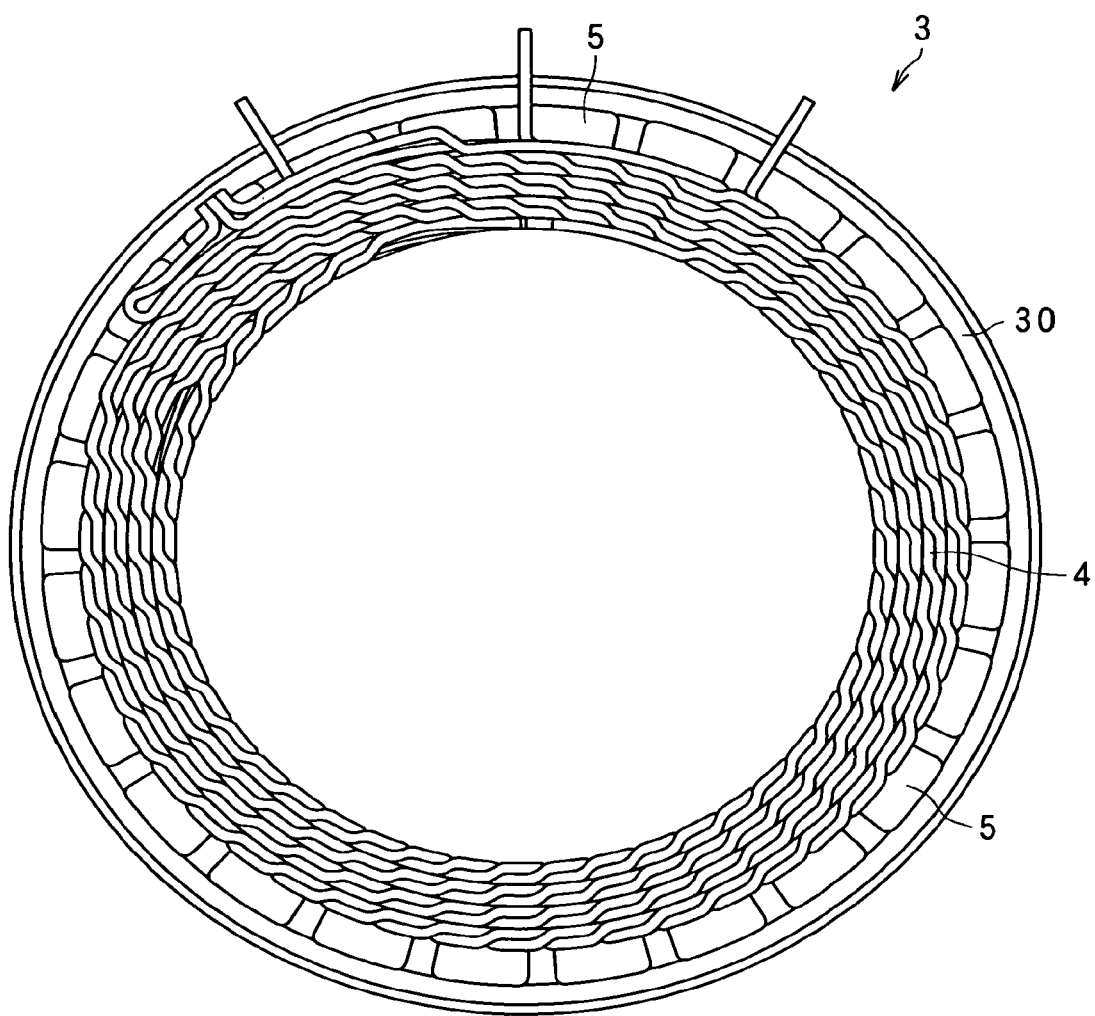
FIG. 2 is a plan view schematically illustrating a stator to be installed in the rotary electric machine according to the embodiment.

As illustrated in FIG. 2, the stator 3 consists of a substantially annular stator core assembly 30, and a plurality of slots 33 defied by the stator core assembly 30. The plurality of slots 33 are circumferentially arranged at given intervals such that each of their longitudinal directions (depth directions) is aligned with a radial direction of the stator core assembly 30.

The stator 3 also consists of a three-phase stator coil 4 made up of a plurality of an insulating-film coated phase windings and provided in the plurality of slots 33, and an electrical insulating paper 5 disposed between the stator core assembly 30 and the stator coil 4.

Figure 3:
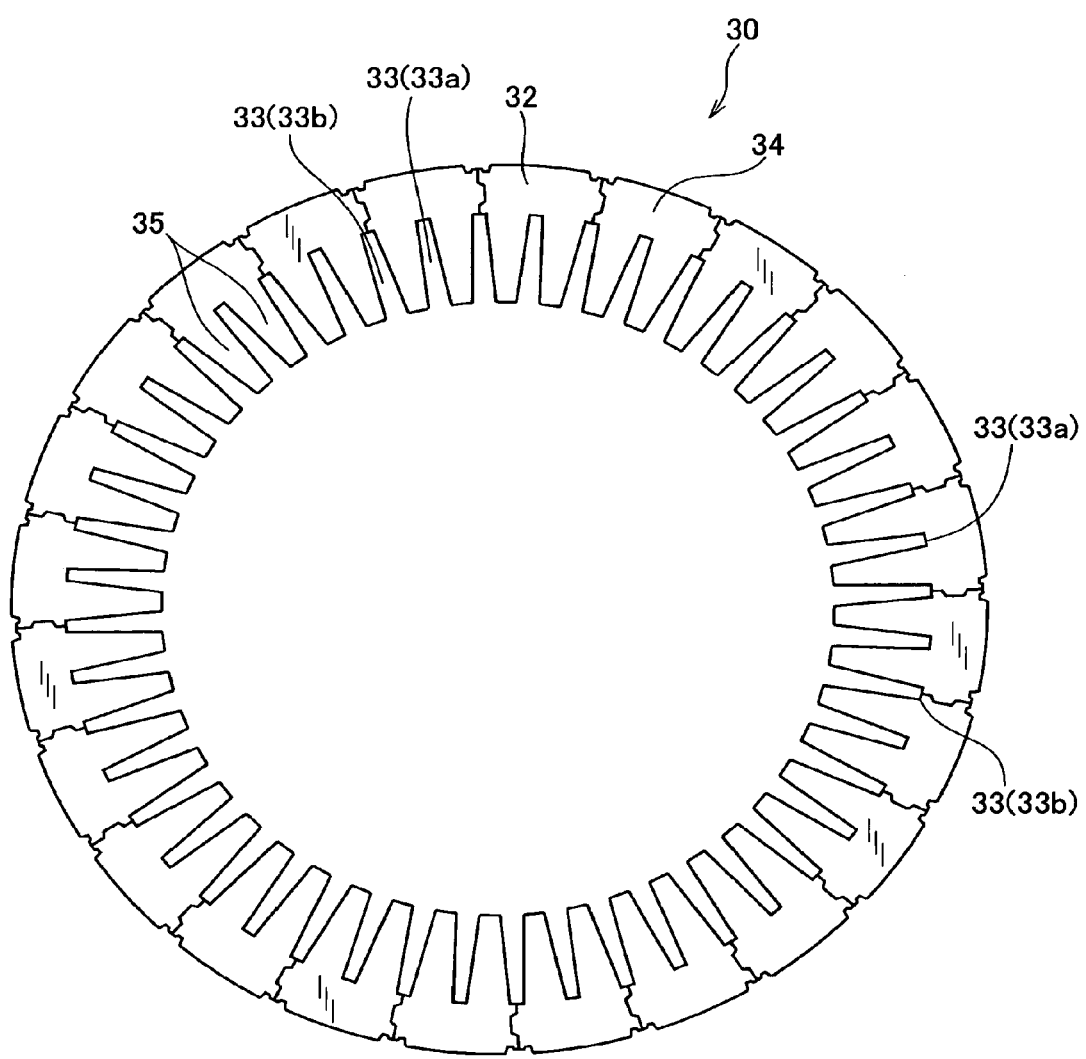
FIG. 3 is a plan view schematically illustrating a stator core assembly of the stator illustrated in FIG. 2.
Figure 4:
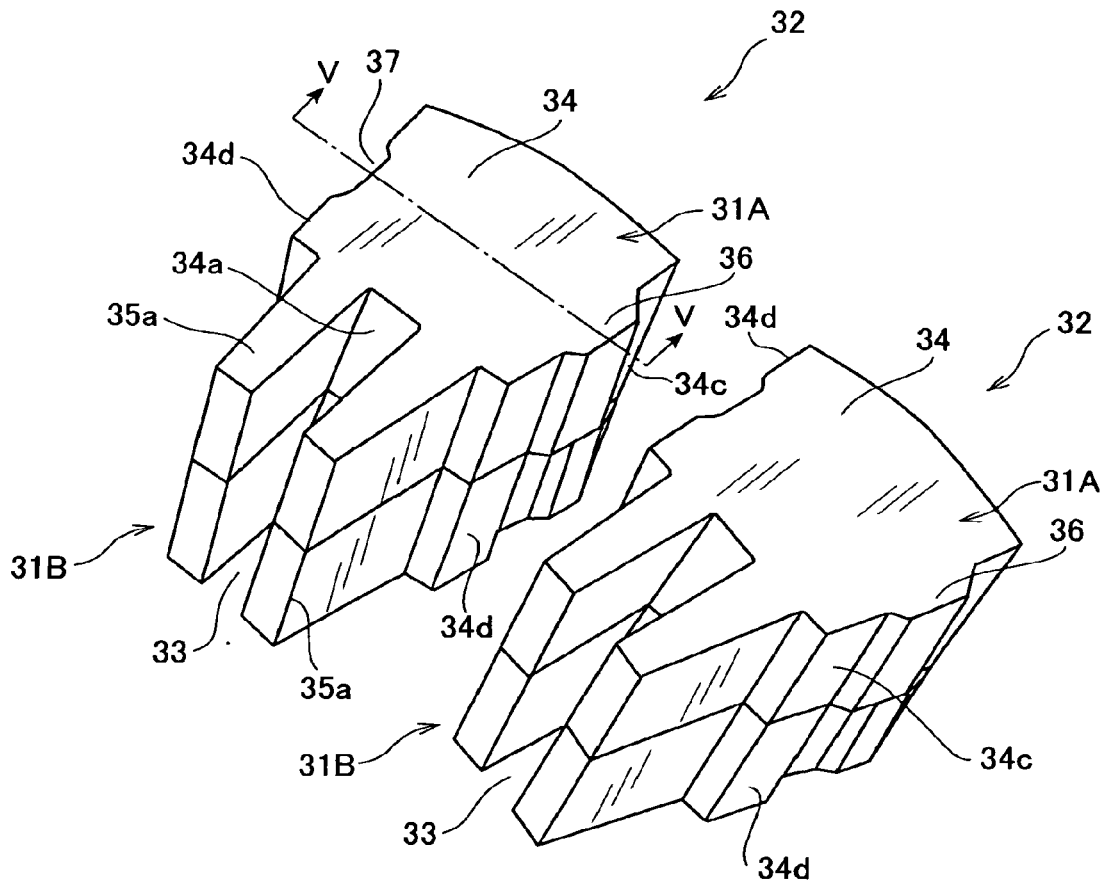
FIG. 4 is an enlarged perspective view schematically illustrating core segments of the stator core assembly illustrated in FIG. 3.
Figure 5:
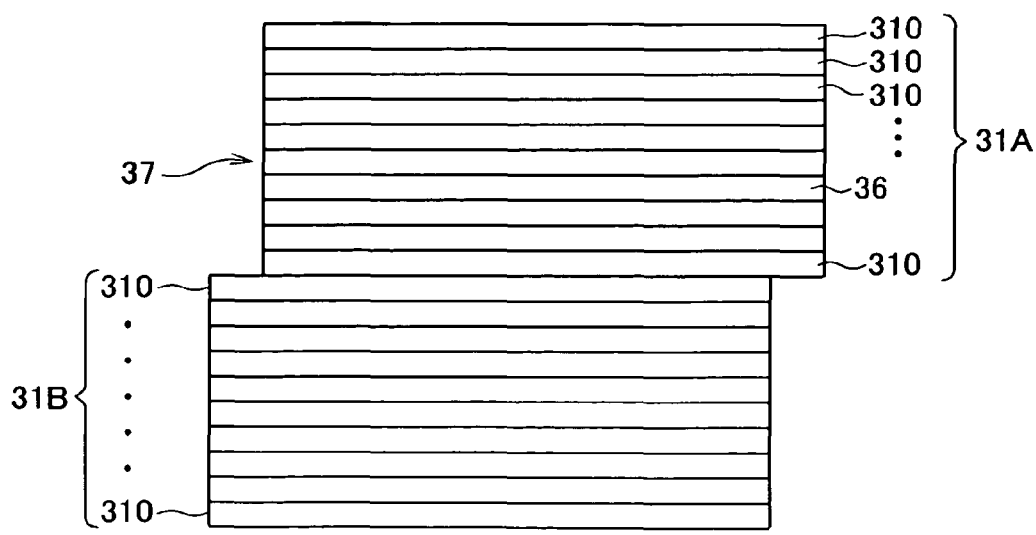
FIG. 5 is a cross sectional view taken on line V-V of FIG. 4.

The stator core assembly 30 is, as illustrated in FIGS. 3 to 5, made up of a plurality of core segments 32. The plurality of core segments 32 are circumferentially arranged such that part of each of the core segments 32 is overlapped in an axial direction of the stator core assembly 30.

Specifically, each of the core segments 32 consists of a first stack member 31A and a second stack member 31B each of which has the same shape. Each of the first and second stack members 31A and 31B is made up of a plurality of, for example, surface-insulated and stamped magnetic steel sheets 310 each with, for example, 0.3 mm in thickness that are stacked in alignment.

Each of the first and second stack members 31A and 31B is made up of a back yoke (back core) 34 having a substantially fan shape in its circumferential cross section. The back yoke 34 works to enclose a magnet circuit of magnetic fluxes created by the stator coil 4.

Each of the first and second stack members 31A and 31B is also made up of a number of, for example, two tooth members 35a radially extending from an inner peripheral surface 34a of the back core 34.

The two tooth members 35a of each of the first and second stack members 31A and 31B are symmetrically arranged with respect to an axial center line of the inner peripheral surface 34a of the back core 34. The axial center line is in parallel to the axial direction of the stator core assembly 30, and divides the area of the inner peripheral side 34a into two equal parts.

Each of the first and second stack members 31A and 31B is provided at its one radial side 34c with a projection 36 circumferentially extending from the one radial side 34c, and at its other radial side 34d with a recess 37 formed in the other radial side 34d. The projection 36 has a shape fittable in the recess 37. For example, in the embodiment, the projection 36 has a substantially trapezoidal shape in its circumferential cross section corresponding to the shape of the recess 37.

The first stack member 31A is, as illustrated in FIG. 4, mounted on the second stack member 31B such that:

the projection 36 of the first stack member 31A is opposite to the recess 37 of the second stack member 31B;

the one radial side 34c of the first stack member 31A is flush with the other radial side 34d of the second stack member 31B;

the recess 37 of the first stack member 31A is opposite to the projection 36 of the second stack member 31B; and the other radial side 34d of the first stack member 31A is flush with the one radial side 34c of the second stack member 31B.

The mount of the first stack member 31A on the second stack member 31B allows the two tooth members 35a of the first stack member 31A to be mounted on the two tooth members 35a of the second stack member 31B. This provides teeth 35 of the core segment 32, and provides a slot 33 between the two teeth 35.

That is, the core segments 32 are circumferentially arranged in the same orientation such that:

the first stack members 31A are flush with each other and the second stack members 31B are flush with each other;

the projection 36 of each of the first stack members 31A is fitted in the recess 37 of an alternative one of the first stack members 31A; this alternative one of the first stack members 31A is adjacent to the one radial side 34c of each of the first stack members 31A; and the projection 36 of each of the second stack members 31B is fitted in the recess 37 of an alternative one of the second stack members 31B; this alternative one of the second stack members 31B is adjacent to the one radial side 34c of each of the second stack members 31B.

This provides a first group of some of the plurality of slots 33 and a second group of the remaining slots 33.

A slot 33a in the first group is arranged between the two teeth 35 of a corresponding one core segment 32. A slot 33b in the second group is arranged between one tooth 35 of one core segment 32 and one tooth 35 of an alternative one core segment 32 radially adjacent to the one core segment 32 (see FIG. 3). The first and second core segments 31A and 31B of the plurality of core segments 32 are designed such that a radial width of each of the slots 33a is the same as that of each of the slots 33b after the plurality of core segments 32 have been assembled into the core assembly 30.

A part of the inner peripheral sides 34a sandwiched between two teeth 35 of a slot 33 is defined as a bottom of the slot 33.

Note that, in the embodiment, part of the entire periphery of each core segment 32 is deburred; this part faces the stator coil 4. This deburring reduces damage of the insulating film of the phase windings of the stator coil 4. The extending ends and their surroundings of the teeth 35 can be only deburred; these extending ends and their surroundings of the teeth 35 can be more frequently contacted and slid on the stator coil 4.

Figure 6:
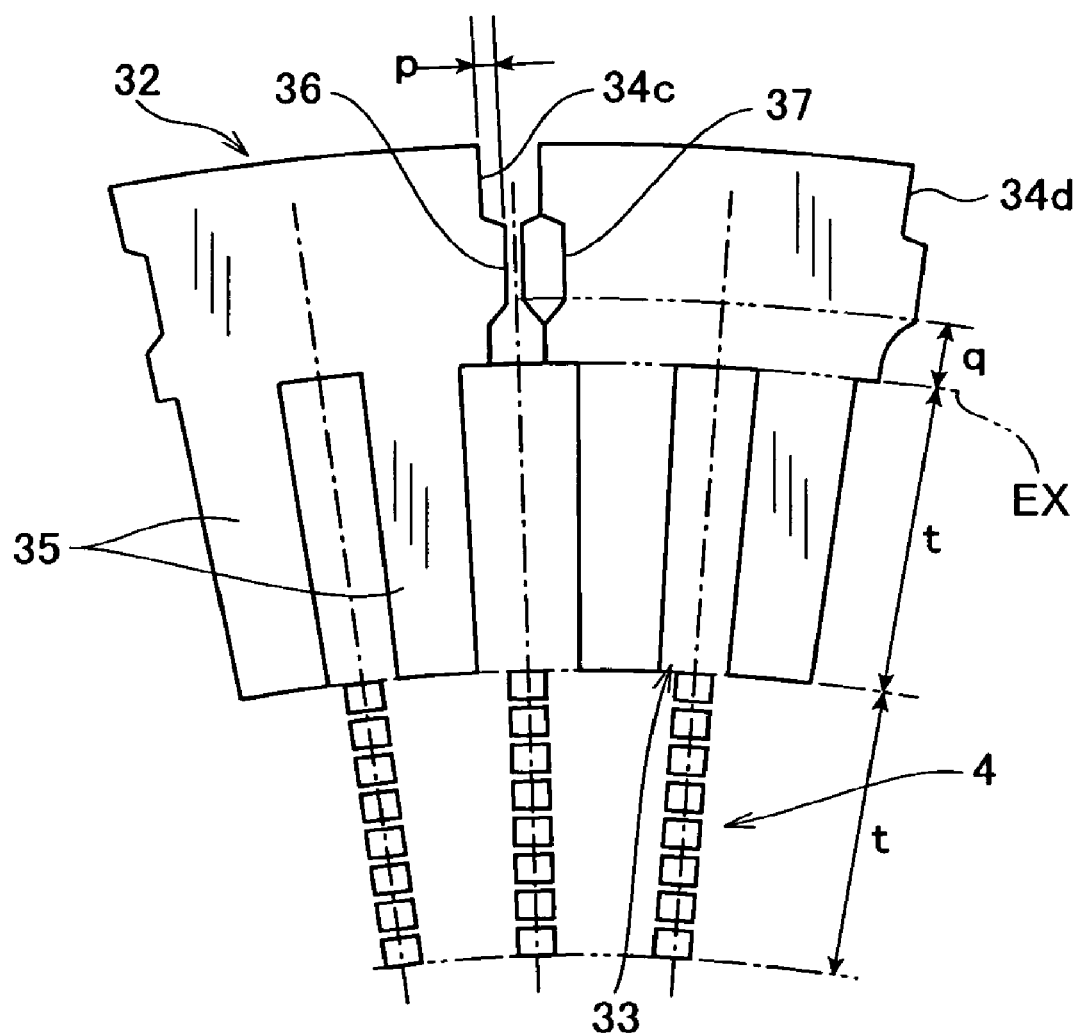
FIG. 6 is an enlarged plan view schematically illustrating part of a stator coil of the stator and the core segments before the core segments are inserted into the stator coil according to the embodiment.

As illustrated in FIG. 6, in the embodiment, it is defined that:

the number of a core segments 32 that are coplanarly aligned in a circumferential direction of the core assembly 30 is "n";

the length of the maximum projecting portion of the projection 36 from the one radial side 34c in a circumferential direction of the core assembly 32 is "p";

the radial length of the maximum projection portion of the projection 36 from a circumferentially extended line EX form the bottom of a corresponding slot 33 is "q"; and the length (depth) of a corresponding slot 33 in a radial direction of the core assembly 30 is "t".

Based on the definition, a core segment 32 is configured to meet the following equation [E1]:

$$0 < \frac{np}{\pi} - q < t \qquad [E1]$$

Note that, in FIG. 6, the length t of a slot 33 in a radial direction of the core assembly 30 and the length of in-slot portions of the stator coil 4 stored in the corresponding slot 33 in a radial direction of the core assembly 30 are substantially the same as each other. The length of a slot 33 in a radial direction of the core assembly 30 and the length of in-slot portions of the stator coil 4 stored in the corresponding slot 33 in a radial direction of the core assembly 30 can be slightly different from each other.

Figure 7A:
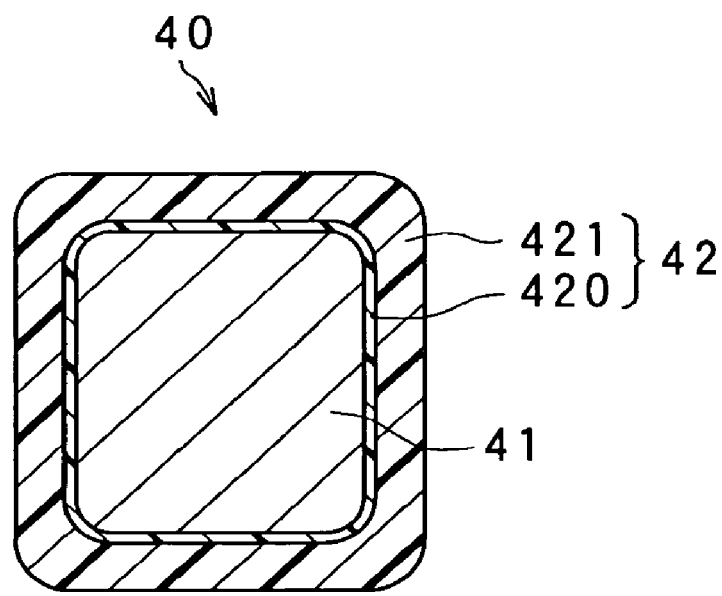
FIG. 7A is a traverse sectional view schematically illustrating a winding of the coil installed in the rotary electric machine of the embodiment.

The stator coil 4 is formed by winding a plurality of wires 40 in a given manner. The wires or windings 40 are, as illustrated in FIG. 7A, each made of a copper conductor 41 and an insulating film 42 wrapped about the conductor 41. The insulating film 42 includes an inner layer 420 and an outer layer 421. The total thickness of the insulating film 42 including the thicknesses of the inner and outer layers 420 and 421 is 100 μm to 200 μm. Such a great thickness of the insulating film 42 eliminates the need for insulating the windings 40 electrically from each other, but the insulating sheet 5, as illustrated in FIG. 2, may be interposed between the windings 40.

The outer layer 421 is made of an insulating material, such as nylon, and the inner layer 420 is made of a thermoplastic resin or an insulating material, such as a polyamideimide, which has a glass transition temperature higher than that of the insulating material of the outer layer 421.

Heat generated in the rotary electric machine 1 contributes the outer layer 421 to soften faster than the inner layer 420. This causes the windings 40 inserted in each slot 33 to thermally adhere at their outer layers 421 to each other. This results in that the windings 40 located in each slot 33 are integrated with each other into one-piece steel bundle, thus improving the mechanical strength of the windings 40 located in each slot 33.

In addition, even if excessive vibrations occurred, the adhesion between the inner layer 420 and the outer layer 421 would be broken up faster than that between the inner layer 420 and the copper conductor 41. This would maintain the adhesion between the inner layer 420 and the copper wire 41 to thereby ensure the insulation of the copper wire 41.

Figure 7B:
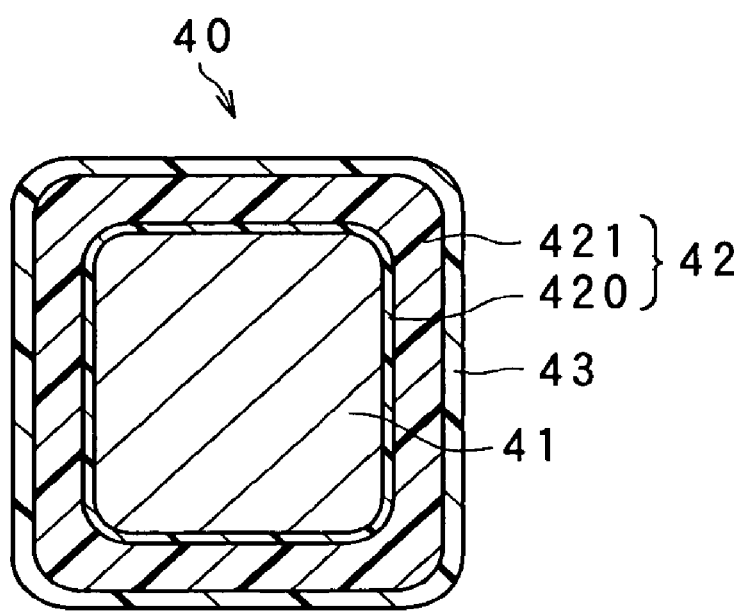
FIG. 7B is a traverse sectional view schematically illustrating a winding of the coil installed in the rotary electric machine of the embodiment.

The winding 40 of the stator coil 4, as illustrated in FIG. 7B, can also have a fusible bonding material 43, such as an epoxy resin, with which the insulating film 42 is covered. When subjected to heat generated in the rotary electric machine 1, the fusible bonding material 43 usually melts faster than the insulating film 42, which contributes the windings 40 in each slot 33 to be bounded thermally to each other through their fusible bonding materials 43. This results in that the windings 40 in each slot 33 are integrated with each other into one-piece steel bundle, thus improving the mechanical strength of the windings 40 located in a same slot 33.

The insulating film 42 to cover each of the windings 40 of the stator coil 4 can be made of a polyphenylene sulfide.

Figure 8:
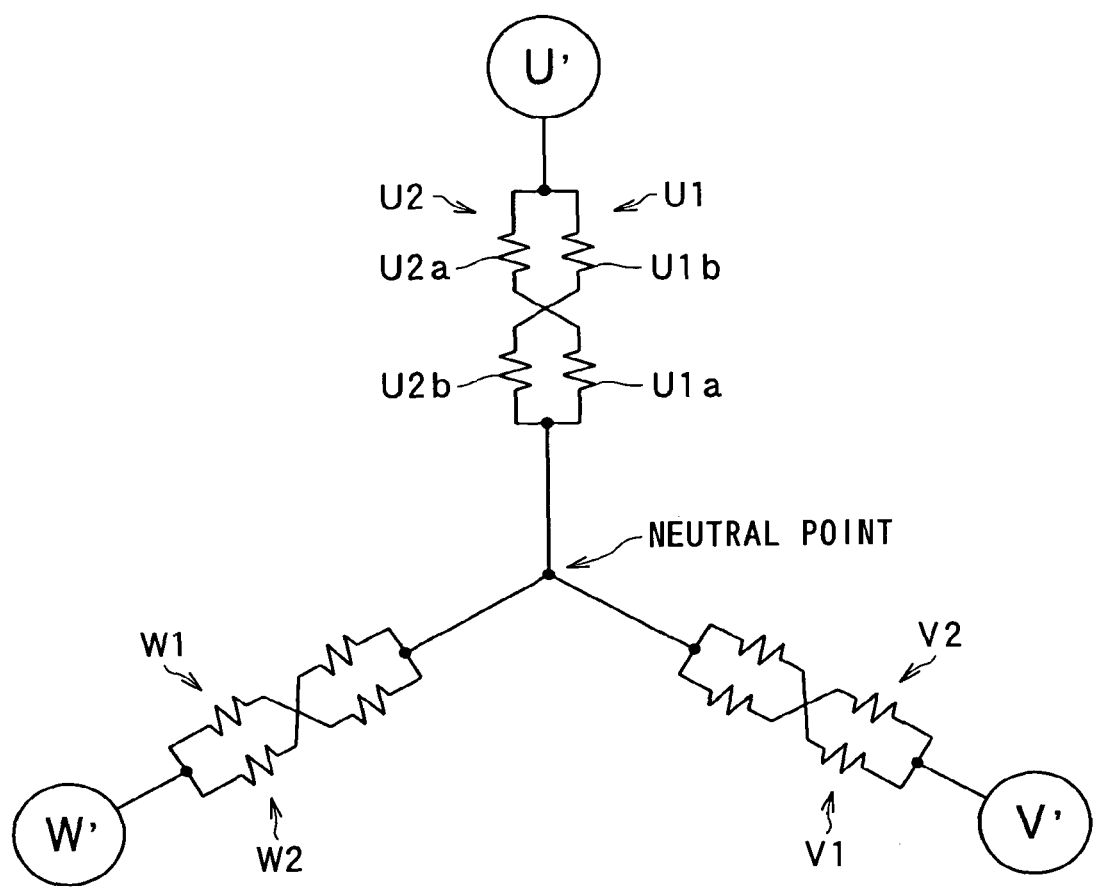
FIG. 8 is a circuit diagram schematically illustrating connections of the windings of the stator coil installed in the rotary electric machine of FIG. 1.

The stator coil 4, as illustrated in FIG. 8, includes a U-phase winding consisting of a pair of U-phase winding segments U1 and U2, a V-phase winding consisting of a pair of V-phase winding segments V1 and V2, and a W-phase winding consisting of a pair of W-phase winding segments W1 and W2.

For example, the U-phase winding segment U1 is made up of a winding U1a and U1b, and the U-phase winding segment U2 is made up of a winding U2a and U2b. The winding U1a and the winding U2a are joined to each other in series, and the winding U2b and the winding U1b are joined to each other in series. The windings U1a and U2a are joined in parallel to the windings U2b and U1b to thereby provide the U-phase winding. Similarly, the V-phase winding and the W-phase wining can be made in the same manner as the U-phase winding (see FIG. 8).

Figure 9:
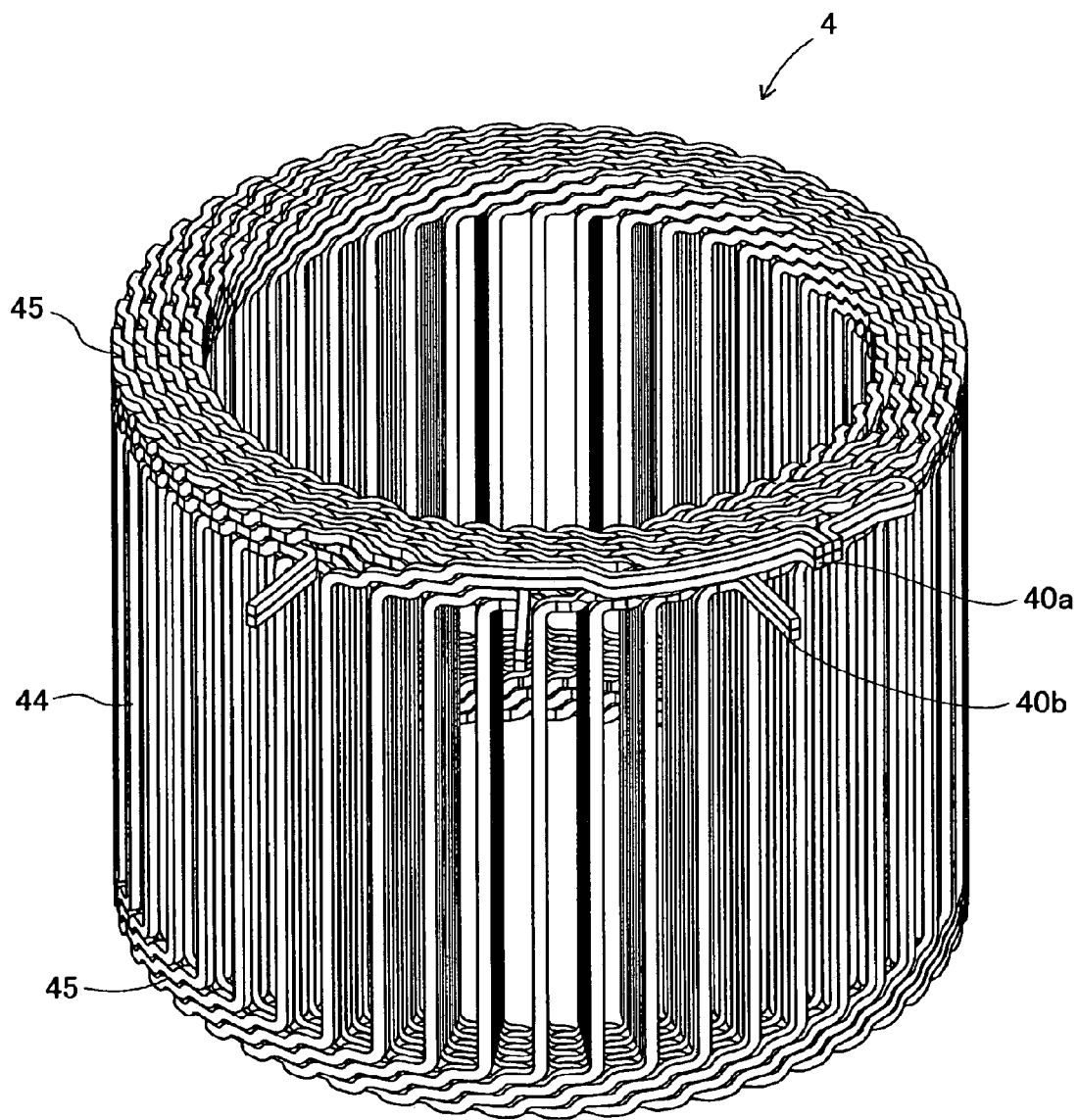
FIG. 9 is a perspective view schematically illustrating the stator coil installed in the rotary electric machine of FIG. 1.

The stator coil 4 is, as illustrated in FIG. 9, constructed by the windings 40 wound together in a predetermined shape.

The windings 40 are formed to be wave-wound through an inside circumference of the stator core assembly 30.

Figure 10:
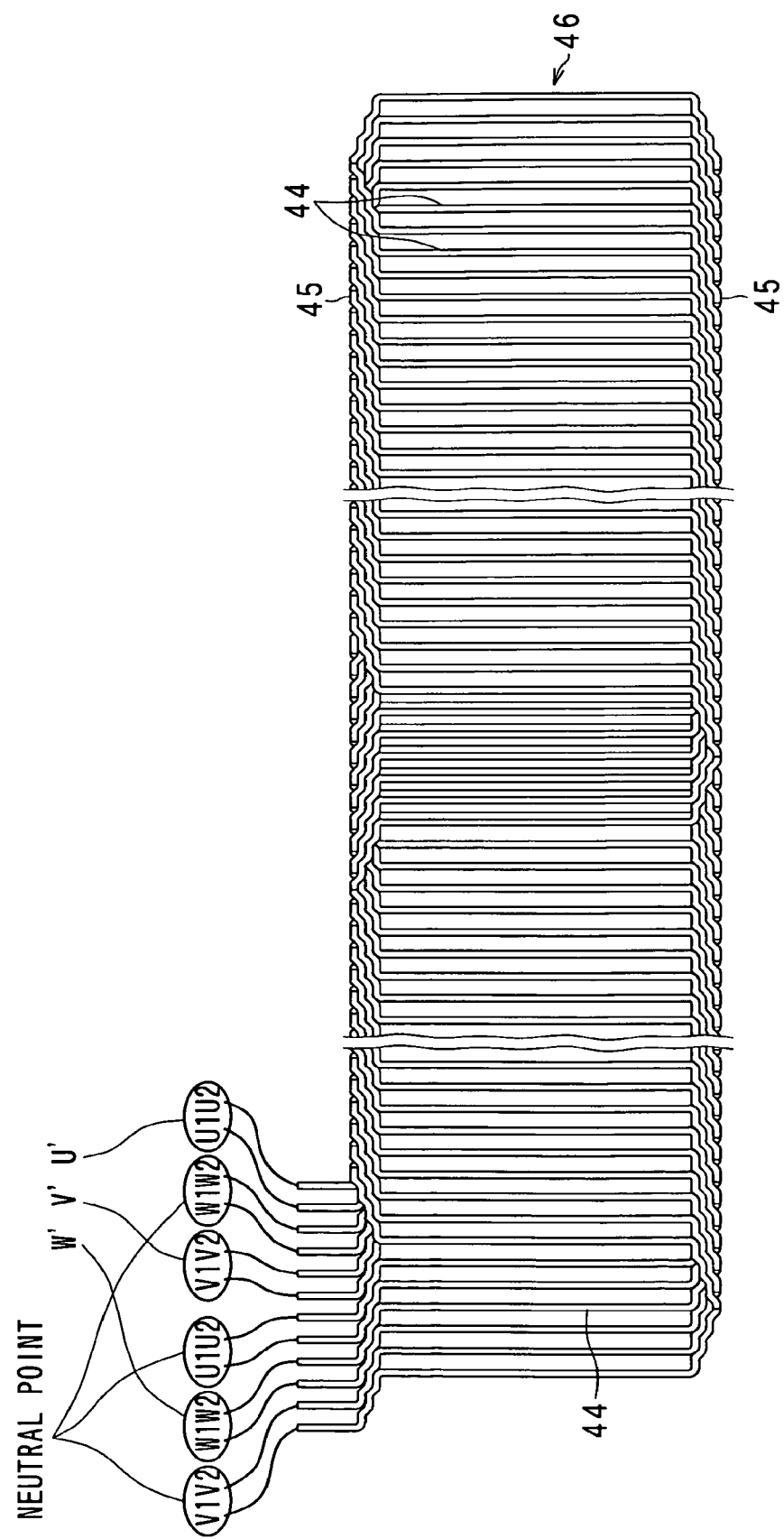
FIG. 10 is a development view of connections of the stator coil installed in the rotary electric machine of FIG. 1.

Each of the windings 40 consists of straight in-slot portions 44 disposed in the slots 33, and turn portions 45 each of which connects two of the in-slot portions 44. The in-slot portions 44 of each of the windings 40 are held in ever predetermined number of the slots 31. In the embodiment, as illustrated in FIG. 10, the in-slot portions 44 of each of the windings 40 are held in every six slots 33. The turned portions 45 project from axial ends of the stator core assembly 30.

Each of the windings 40 of the stator coil 4 is wave-wound in the circumferential direction with one end thereof projecting from one axial end of the stator core 30 as a phase terminal U', V' or W' and the other end thereof projecting from the other axial end of the stator core assembly 30 as a neutral point.

As can be seen from FIG. 8, the U-phase winding of the stator coil 4 is made up of the circumferentially wave-wounded winding U1a of the U-phase winding segment U1 and the circumferentially wave-wounded winding U2a of the U-phase winding segment U2; these windings U1a and U2a are joined integrally at their one ends. The U-phase winding is also made up of the circumferentially wave-wounded winding U2b of the U-phase winding segment U2 and the circumferentially wave-wounded winding U1b of the U-phase winding segment U1; these windings U2b and U1b are joined integrally at their one ends. The other ends of the windings U1b and U2a constitute the output, and the other ends of the windings U1a and U2b constitute the neutral point.

The in-slot portions 44 of the windings U1a and U1b are disposed in the same slots 33, and the in-slot portions 44 of the windings U2a and U2b are disposed in the other sane slots 33.

The in-slot portions 44 of the winding U1a and the in-slot portions 44 of the winding U1b are laid to overlap each other alternately in a depth-wise direction of the slots 31. Similarly, the in-slot portions 44 of the winding U2a and the in-slot portions 44 of the winding U2b are laid to overlap each other alternately in a depth-wise direction of the slots 31.

The windings U1a and U2a are joined at their one ends; these joint ends define, as illustrated in FIG. 10, the in-slot portion 44 that is a winding turn portion 46 of the winding 40. Similarly, the windings U1b and U2b are joined at their one ends; these joint ends define, as illustrated in FIG. 10, the in-slot portion 44 that is a winding turn portion 46 of the winding 40.

Each of the V-phase winding and the W-phase winding has the same structure as the U-phase winding.

Specifically, as illustrated in a development view of the stator coil 4 of FIG. 10, the stator coil 4 is made up of six pairs of two winding members 40a and 40b having different winding directions, such as the windings U1a and U2a; these six pairs correspond to the six phase segments (U1, U2, V1, V2, W1, and W2), respectively. As described as the windings U1a, U2a, U1b, and U2b, the winding member 40a is joined at its one end with one end of the winding member 40b; the other end of the winding member 40a is joined to the neutral point, and the other end of the winding member 40b constitutes a phase terminal.

The windings 40a and 40b of each pair are joined at their one ends; these joint ends define, as illustrated in FIG. 10; the in-slot portion 44 that is a winding t portion 46 of the winding 40.

Each of the six pairs of the two winding members 40a and 40b is formed to have a predetermined number of turns, such as four turns, in the circumferential direction of the stator coil 4. Specifically, the stator coil 4 is configured such that each of the six pairs of the two winding members 40a and 40b provides four layers laid to overlap each other in a corresponding radial direction of the stator coil 4.

Next, the functions of the structure of the stator core assembly 30 will be described hereinafter using a method of producing the stator 4.

First, a method of producing the stator 4 of the rotary electric machine 1 according to the embodiment will be described.

First, the stator coil 4 having the configuration set forth above is formed using the windings 40.

Next, the predetermined number n of core segments 32 each having the configuration set forth above are formed.

Figure 11A:
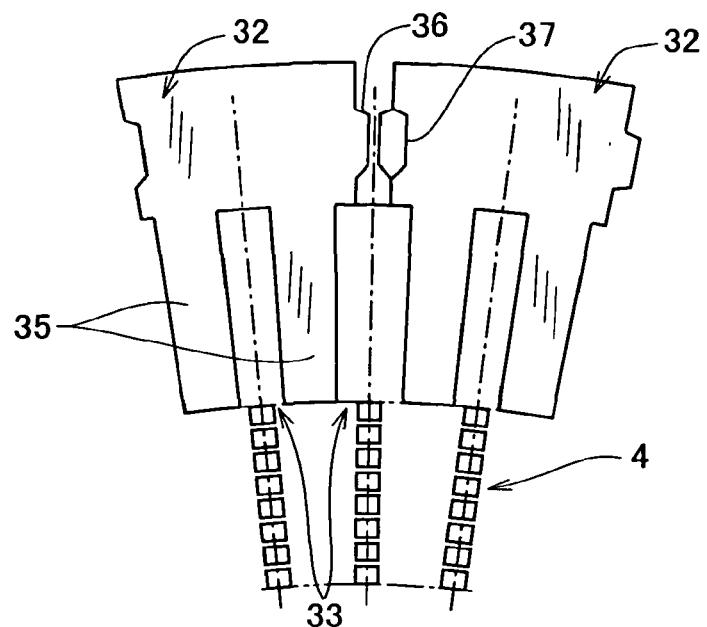
FIG. 11A is a plan view schematically illustrating, during a process of producing the stator, a state that the core segments are located around the outer circumference of the stator coil according to the embodiment.

Next, the predetermined number n of core segments 32 are circumferentially aligned around the outer circumference of the stator coil 4 such that each of the slots 33 faces a corresponding group of the radially aligned in-slot portions 44 to be disposed therein (see FIG. 11A).

Thereafter, the circumferentially arranged core segments 32 are moved toward the center axis of the stator coil 4 while they are shifted to be close to each other.

Figure 11B:
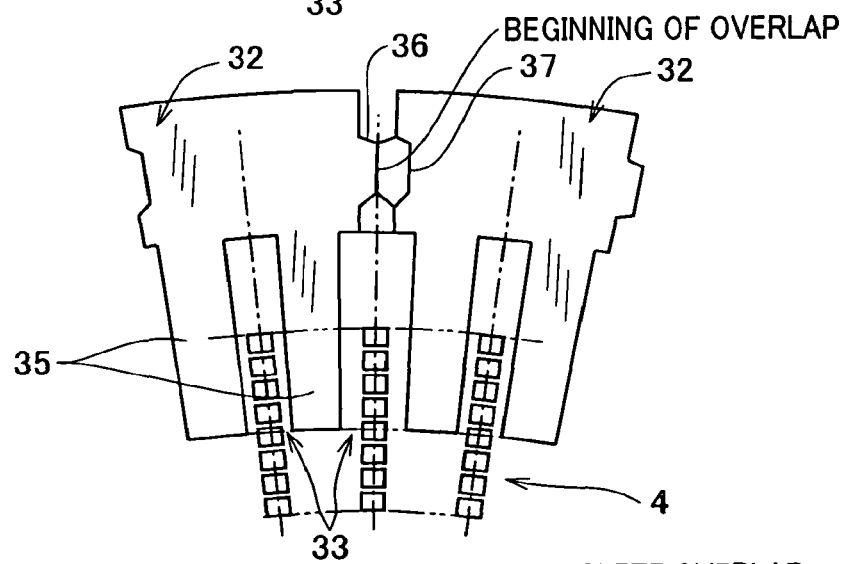
FIG. 11B is a plan view schematically illustrating, during the process of producing the stator, a state that the core segments are moved into the stator coil according to the embodiment.

The movement and shift of the core segments 32 allows the radially aligned in-slot portions 44 to begin to be inserted in a corresponding slot 33 (see FIG. 11B). The movement and shift of the core segments 32 also allows the projection 36 of the first stack member 31A of each of the core segments 32 to begin to be overlapped with the projection 36 of the second stack member 31B of an alternative core segment 32 adjacent to the projection 36 of the first stack member 31A of each of the core segments 32 (see FIG. 11B).

Figure 11C:
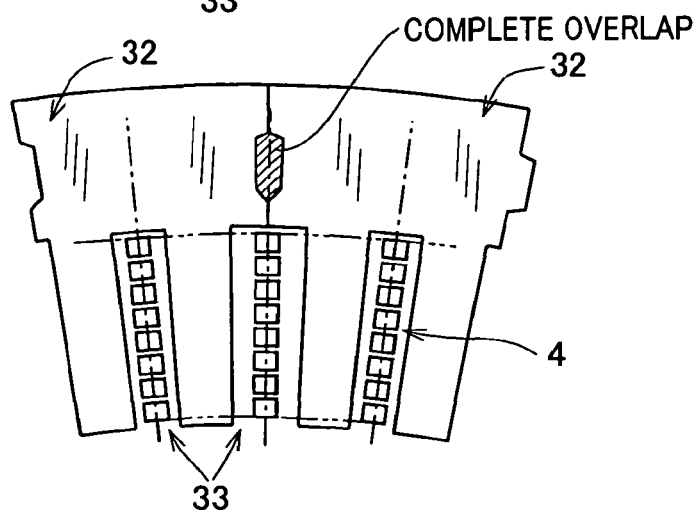
FIG. 11C is a plan view schematically illustrating, during the process of producing the stator, a state that the core segments are completely inserted in the stator coil according to the embodiment.

Additional movement and shift of the core segments 32 allows:

the radially aligned in-slot portions 44 to be completely accommodated in a corresponding slot 33;

the projection 36 of the first stack member 31A of each of the core segments 32 to be fitted in the recess 37 of the first stack member 31A of the adjacent alternative core segment 32; and the projection 36 of the second stack member 31B of each of the core segments 32 to be fitted in the recess 37 of the second stack member 31B of an alternative core segment 32 adjacent to the projection 36 of the second stack member 31B of each of the core segments 32 (see FIG. 11C).

This results in that the one radial side 34c of the first stack member 31A of each of the core segments 32 is brought into intimate contact with the other radial side 34d of the adjacent alternative core segment 32, thus forming the stator core 3.

Next, the configuration of each of the core segments 32 defined in the equation [E1] will be described hereinafter.

Figure 12:
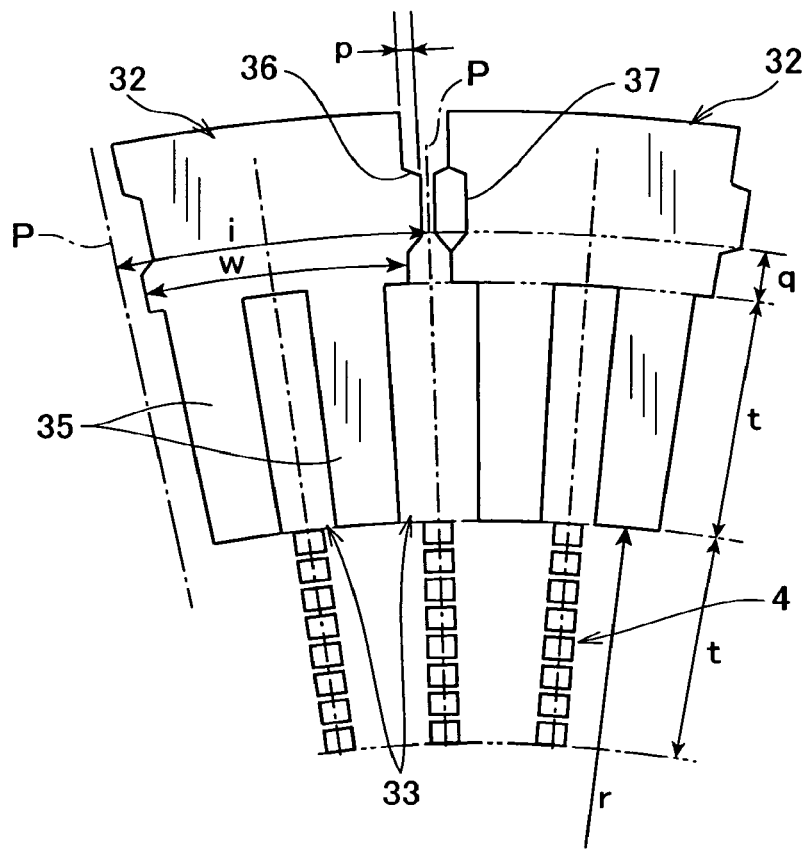
FIG. 12 is a plan view of the core segments and stator coil schematically illustrating a relationship between the core segments and the stator coil before the core segments are inserted into the stator coil according to the embodiment.

In each of the core segments 32, as illustrated in FIG. 12, it is defined that:

the distance between the center axis of the stator coil 4 and an end surface of each of the teeth 35 is "r";

the circumferential length (arc length) between the one radial side 34c and the other radial side 34d of each of the core segments 32 is "w";

the circumferential length (arc length) between adjacent phantom lines P, each of which extends from the center axis of the stator coil 4 along the center of each of the radially aligned in-slot portions 44 corresponding to a slot 33b is "i"; and the inner diameter of the stator coil 4 is "d".

Based on the definition, the circumferential length w and the circumferential length i are represented respectively by the following equations [E2] and [E3]:

$$w = \left(\frac{d}{2} + t\right)\frac{2\pi}{n} \quad [E2]$$

$$i = (r + t + q)\frac{2\pi}{n} \quad [E3]$$

The equations [E2] and [E3] derives the following equation [E4] that defines a circumferential length "e" between the one radial side 34d of each of the core segments 32 and one phantom line P adjacent to the one radial side 34d thereof:

$$e = \frac{i - w}{2} \quad [E4]$$

$$= \frac{(r + t + q)\frac{2\pi}{n} - \left[\frac{d}{2} + t\right]\frac{2\pi}{n}}{2}$$

$$= \frac{\pi}{n}\left(r - \frac{d}{2} + q\right)$$

As illustrated in FIG. 11C, when the core segments 32 are completely inserted in the stator coil 4 so that the stator core assembly 30 is formed, the following equation [E5] is established, and therefore the equation [E4] can be expressed by the following equation [E6]:

$$r = \frac{d}{2} \quad [E5]$$

$$e = \frac{\pi}{n}q \quad [E6]$$

As illustrated in FIGS. 11C and 12, in order to completely fit the projections 36 of each core segment 32 into the corresponding recesses 37 of alternative core segments 36 located on both sides of each core segment 32, the following equation [E7] and the following equation [E8] obtained by deforming the equation [E7] are needed to be established:

$$p > e = \frac{\pi}{n}q \quad [E7]$$

$$\frac{np}{\pi} - q > 0 \quad [E8]$$

In contrast, as illustrated in FIG. 11A, when the core segments 32 are before inserting, the following equation [E9] is established, and the following equation [E10] obtained by deforming the equation [E9] is established:

$$r = \frac{d}{2} + t \quad [E9]$$

$$e = \frac{\pi}{n}(t + q) \quad [E10]$$

As illustrated in FIGS. 11A and 12, when the core segments 32 are before inserting, because the projections 36 of each core segment 32 are not overlapped with the corresponding adjacent projections 36 of alternative core segments 36 located on both sides of each core segment 32, the following equation [E11] and the following equation [E12] obtained by deforming the equation [E11] are needed to be established:

$$p < e = \frac{\pi}{n}(t+q) \qquad \text{[E11]}$$

$$\frac{np}{\pi} - q < t \qquad \text{[E12]}$$

The equations [E8] and E12] derive the equation [E1] set forth above:

$$0 < \frac{np}{\pi} - q < t \qquad \text{[E1]}$$

As described above, the stator core assembly 30 is configured such that each of the core segments 32 is formed to meet the equation [E1].

The configuration allows, when the core segments 32 are before inserting into the stator coil 4 during the stator core assembly forming process, the projections 36 of each core segment 32 not to be overlapped with the corresponding adjacent projections 36 of alternative core segments 36 located on both sides of each core segment 32.

The configuration also allows, when the core segments 32 are completely inserted in the stator coil 4 to thereby form the stator core assembly 30, the projections 36 of each core segment 32 to be completely fitted in the corresponding recesses 37 of alternative core segments 36 located on both sides of each core segment 32.

Thus, when the core segments 32 is to be inserted into the stator coil 4, it is possible to circumferentially hold each core segment 32 from both sides 34c and 34d of the back yoke 34 thereof with an assembly jig (not shown) to thereby insert the core segments 32 into the stator coil 4.

This achieves an advantage of reducing the fluctuations of the teeth 35 of the core segments 32 when the core segments 32 are inserted into the stator coil 4 to thereby prevent damage of the stator coil 4. The advantage provides the stator 3 with high assembly of the core segments 32.

In addition, the configuration of the stator core assembly 30 reduces overlapped areas between the projections 36 of each core segment 32 and corresponding projections 36 of alternative core segments 32 located both sides of each core segment 32 to thereby maintain the overlapped areas within the range defined by the equation E1. This achieves an advantage of reducing eddy-current loss through the overlapped portions 36 of the stator core assembly 30 to thereby improve the performance of the rotary electric machine 1.

The stator 3 according to the embodiment can be deformed or modified within the scope of the present invention, and therefore, each of the core segments 32 is not limited to the structure of the core segment 32 according to the embodiment.

Figure 13:
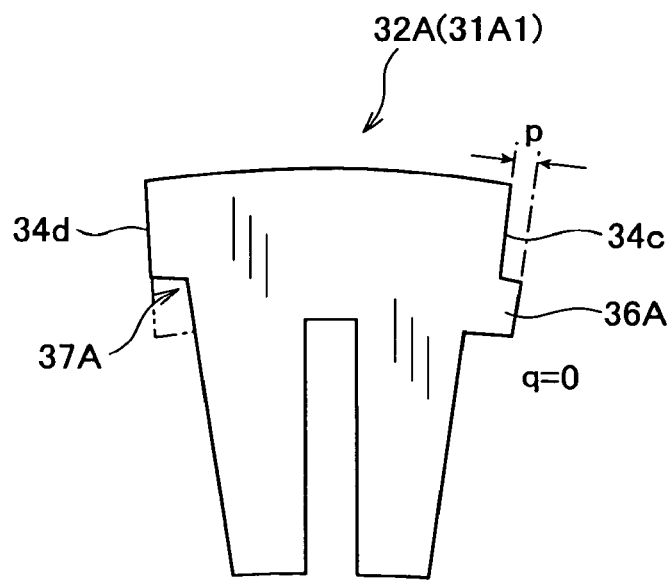
FIG. 13 is an enlarged plan view schematically illustrating a core segment of a stator core assembly according to the first modification of the embodiment.

The structure of a core segment 32A in place of a core segment 32 is illustrated in FIG. 13 as the first modification of the embodiment.

Referring to FIG. 13, a first stack member 31A1 of the core segment 32A has the same structure as the first stack member 31 except for the following points.

Specifically, the first stack member 31A1 is provided at its one radial side 34c with a projection 36A circumferentially extending from an inner most portion of the one radial side 34c, and at its other radial side 34d with a recess 37A formed in an inner most portion of the other radial side 34d. The projection 36A has a shape fittable in the recess 37A. For example, in the first modification, the projection 36A has a substantially rectangular shape in its circumferential cross section corresponding to the shape of the recess 37A.

The second stack member (not shown) has the same shape as the first stack member 31A1.

As well as the core segment 32, the first stack member 31A1 is mounted on the second stack member such that:

the projection 36A of the first stack member 31A1 is opposite to the recess 37A of the second stack member;

the one radial side 34c of the first stack member 31A1 is flush with the other radial side 34d of the second stack member;

the recess 37A of the first stack member 31A1 is opposite to the projection 36A of the second stack member; and the other radial side 34d of the first stack member 31A1 is flush with the one radial side 34c of the second stack member.

Because each of the core segments 32A is formed to meet the equation [E1] on the condition that the length q is zero, it is possible to achieve the same advantages as the embodiment.

Figure 14:
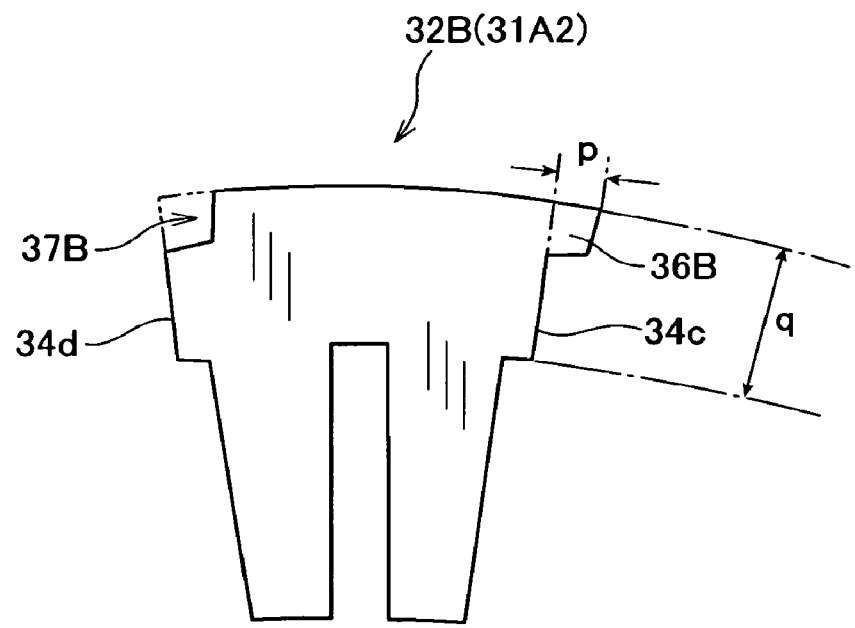
FIG. 14 is an enlarged plan view schematically illustrating a core segment of a stator core assembly according to the second modification of the embodiment.

The structure of a core segment 32B in place of a core segment 32 is illustrated in FIG. 14 as the second modification of the embodiment.

Referring to FIG. 14, a first stack member 31A2 of the core segment 32B has the same structure as the first stack member 31 except for the following points.

Specifically, the first stack member 31A2 is provided at its one radial side 34c with a projection 36B circumferentially extending from an outer most portion of the one radial side 34c, and at its other radial side 34d with a recess 37B formed in an outer most portion of the other radial side 34d. The projection 36B has a shape fittable in the recess 37B. For example, in the second modification, the projection 36B has a substantially rectangular shape in its circumferential cross section corresponding to the shape of the recess 37B.

The second stack member (not shown) has the same shape as the first stack member 31A2.

As well as the core segment 32, the first stack member 31A2 is mounted on the second stack member such that:

the projection 36B of the first stack member 31A2 is opposite to the recess 37B of the second stack member;

the one radial side 34c of the first stack member 31A2 is flush with the other radial side 34d of the second stack member;

the recess 37B of the first stack member 31A2 is opposite to the projection 36B of the second stack member; and the other radial side 34d of the first stack member 31A2 is flush with the one radial side 34c of the second stack member.

Because each of the core segments 32B is formed to meet the equation [E1], it is possible to achieve the same advantages as the embodiment.

Figure 15:
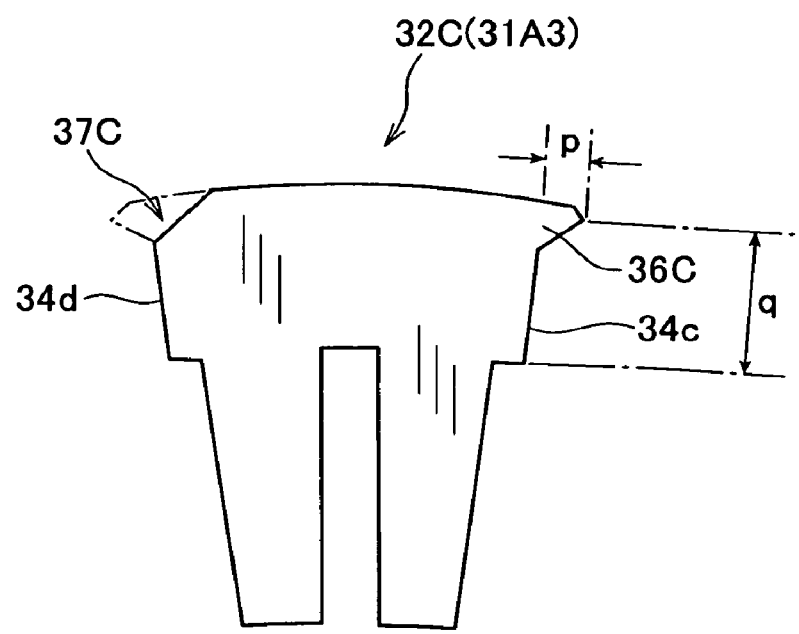
FIG. 15 is an enlarged plan view schematically illustrating a core segment of a stator core assembly according to the third modification of the embodiment.

The structure of a core segment 32C in place of a core segment 32 is illustrated in FIG. 15 as the second modification of the embodiment.

Referring to FIG. 15, a first stack member 31A3 of the core segment 32C has the same structure as the first stack member 31 except for the following points.

Specifically, the first stack member 31A3 is provided at its one radial side 34c with a projection 36C circumferentially extending from an outer most portion of the one radial side 34c, and at its other radial side 34d with a recess 37C formed in an outer most portion of the other radial side 34d. The projection 36C has a shape allowing to fit in the recess 37C. For example, in the third modification, the projection 36C has a substantially angle shape in its circumferential cross section corresponding to the shape of the recess 37C.

The second stack member (not shown) has the same shape as the first stack member 31A3.

As well as the core segment 32, the first stack member 31A3 is mounted on the second stack member such that:

the projection 36C of the first stack member 31A3 is opposite to the recess 37C of the second stack member;

the one radial side 34c of the first stack member 31A3 is flush with the other radial side 34d of the second stack member;

the recess 37C of the first stack member 31A3 is opposite to the projection 36C of the second stack member; and the other radial side 34d of the first stack member 31A3 is flush with the one radial side 34c of the second stack member.

Because each of the core segments 32C is formed to meet the equation [E1], it is possible to achieve the same advantages as the embodiment.

Figure 16:
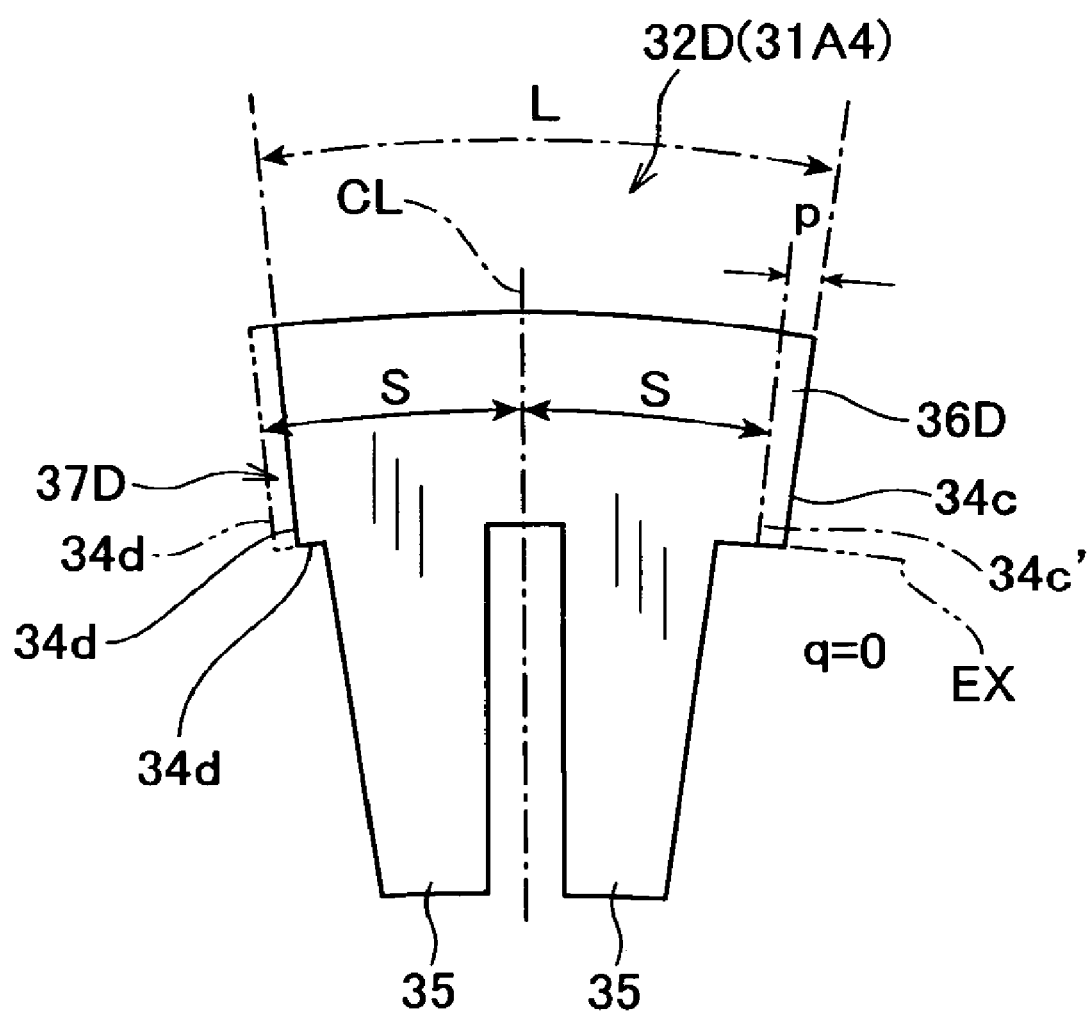
FIG. 16 is an enlarged plan view schematically illustrating a core segment of a stator core assembly according to the fourth modification of the embodiment.

Referring to FIG. 16, a first stack member 31A4 of the core segment 32D has the same structure as the first stack member 31 except for the following points.

Specifically, the first stack member 31A4 is provided with a first radial side 34c circumferentially extending from a radial line 34c' described hereinafter, and with a second radial side 34d opposite to the first radial side 34c.

The second stack member (not shown) has the same shape as the first stack member 31A4.

In the fourth modification, a circumferential length (arc) between a circumferentially maximum portion of the first radial side 34c and a circumferentially maximum portion of the second radial side 34d is represented as L. A radial center line radially passing at a center of the bottom of the slot is represented as CL, and a circumferential length "s" of the radial line 34c' from the radial center line CL can be defined as a circumferential length of (L/2) from the radial center line CL.

Based on the circumferential length "s", the length "p" can be represented as a circumferential length of from the radial line 34c' separated by the circumferential length s from the radial center line CL. A radial length, from a circumferentially extended line EX from the bottom of the slot, of the circumferentially maximum portion of the first radial side of the core segment 32D is represented as q.

As well as the core segment 32, the first stack member 31A4 is mounted on the second stack member such that:

the first radial side 34c of the first stack member 31A4 is opposite to the second radial side 34d of the second stack member; and the second radial side 34d of the first stack member 31A4 is opposite to the first radial side 34c of the second stack member.

Like the embodiment, the plurality of core segments 32D are circumferentially arranged such that:

the first radial side 34c of each of the plurality of core segments 32D is closely contacted onto the second radial side 34d of an alternative one of the plurality of core segments 32D to thereby provide the stator core assembly 30.

When each of the first radial side 34c and the second radial side 34d is parallel to a corresponding radial line of the core segment 30, the circumferentially maximum portion of the first radial side 34c corresponds to an innermost thereof located on the circumferentially extended line EX, and therefore, the length q becomes zero.

Thus, because each of the core segments 32D is formed to meet the equation [E1] on the condition that the length q is zero, it is possible to achieve the same advantages as the embodiment.

Note that, in the fourth modification, when the first radial side 34c is inclined to a corresponding radial line of the core segment 30 so that its outermost circumferentially projects, the circumferentially maximum portion of the first radial side 34c corresponds to the projecting outermost thereof.

In the fourth modification, when the first radial side 34c is inclined to a corresponding radial line of the core segment 30 so that its innermost circumferentially projects, the circumferentially maximum portion of the first radial side 34c corresponds to the projecting innermost thereof.

The stator coil 4 can have another annular structure.

While there has been described what is at present considered to be the embodiment and its modifications of the present invention, it wilt be understood that various modifications which are not described yet may be made therein, and it is intended to cover in the appended claims all such modifications as fail within the scope of the invention.

What is claimed is:

1. A stator for a rotary electric machine, the stator comprising:

a stator core assembly provided with a plurality of core segments; and a stator coil assembled in the stator core assembly, each of the plurality of core segments comprising:

a yoke having an inner circumferential surface, a first radial side, and a second radial side opposite thereto;

two teeth extending, in corresponding radial directions of the stator core assembly, from the inner circumferential surface and circumferentially aligned at a space therebetween, the two teeth and a part of the inner circumferential surface between the two teeth defining a slot, the part of the inner circumferential surface being defined as a bottom of the slot;

a circumferential projection formed on at least part of one of the first and second radial sides; and a recess formed in the other of the first and second radial sides, the projection having a shape to be fitted in the recess, the plurality of core segments being circumferentially arranged such that the circumferential projection of each of the plurality of core segments is fitted in the recess of an alternative one of the plurality of core segments to thereby provide the stator core assembly, the recess of the alternative one of the plurality of core segments being circumferentially adjacent to the projection of each of the plurality of core segments, wherein, when a number of the plurality of core segments circumferentially arranged is represented as n, a length of a maximum projecting portion of the circumferential projection of each of the plurality of core segments from the one of the first and second radial sides thereof is represented as p, a radial length of the maximum projecting portion of the projection of each of the plurality of core segments from a circumferentially extended line from the bottom of the slot is represented as q, and a length of the slot with respect to the bottom thereof in a radial direction of the stator core assembly is represented as t, the number n, the length p, the length q, and the length t meet the following equation:

$$0 < \frac{np}{\pi} - q < t.$$

2. The stator according to claim 1, wherein each of the plurality of core segments is made up of at least one metal sheet.

3. The stator according to claim 1, wherein each of the core segments is made up of a plurality of metal sheets stacked in alignment, the plurality of metal sheets have a same shape.

4. A stator for a rotary electric machine, the stator comprising:
- a stator core assembly provided with a plurality of core segments; and
- a stator coil assembled in the stator core assembly,
- each of the plurality of core segments comprising:
- a yoke having an inner circumferential surface, a first radial side, and a second radial side opposite thereto;
- two teeth extending, in corresponding radial directions of the stator core assembly, from the inner circumferential surface and circumferentially aligned at a space therebetween, the two teeth and a part of the inner circumferential surface between the two teeth defining a slot, the part of the inner circumferential surface being defined as a bottom of the slot;
- the plurality of core segments being circumferentially arranged such that the first radial side of each of the plurality of core segments is closely contacted onto the second radial side of an alternative one of the plurality of core segments to thereby provide the stator core assembly, a circumferential length between a circumferentially maximum portion of the first radial side and a circumferentially minimum portion of the second radial side of each of the plurality of core segments being represented as L, a circumferential length s from a radial center line radially passing at a center of the bottom of the slot being defined as a circumferential length of (L/2) from the radial center line,
- wherein, when a number of the plurality of core segments circumferentially arranged is represented as n, a circumferential length from a radial line separated by the circumferential length s from the radial center line is represented as p, a radial length, from a circumferentially extended line from the bottom of the slot, of the circumferentially maximum portion of the first radial side of each of the plurality of core segments is represented as q, and a length of the slot with respect to the bottom thereof in a radial direction of the stator core assembly is represented as t, the number n, the length p, the length q, and the length t meet the following equation:

$$0 < \frac{np}{\pi} - q < t.$$

5. A rotary electric machine comprising:
- a stator according to claim 1, the stator coil of the stator having a substantially annular shape; and
- a rotor having an outer circumferential surface and disposed such that an inner circumference of the stator coil surrounds the outer circumferential surface of the rotor, the rotor comprising a plurality of first poles and a plurality of second poles, each of the first pole being different in magnetic polarity from each of the second pole, the first poles and the second poles being alternately arranged on the outer circumference of the rotor in a circumferential direction thereof.

* * * * *